(12) United States Patent
Darnell

(10) Patent No.: US 10,021,895 B2
(45) Date of Patent: Jul. 17, 2018

(54) METHOD FOR QUICKLY PREPARING A MARSHMALLOW BASED SNACK

(71) Applicant: EDISON NATION, LLC, Charlotte, NC (US)

(72) Inventor: Donald Lee Darnell, Auburn, CA (US)

(*) Notice: Subject to any disclaimer, the term of this patent is extended or adjusted under 35 U.S.C. 154(b) by 524 days.

(21) Appl. No.: 14/050,157

(22) Filed: Oct. 9, 2013

(65) Prior Publication Data

US 2014/0099411 A1    Apr. 10, 2014

Related U.S. Application Data

(60) Provisional application No. 61/712,150, filed on Oct. 10, 2012.

(51) Int. Cl.
| | | |
|---|---|---|
| *A23G 3/54* | (2006.01) | |
| *A47J 36/02* | (2006.01) | |
| *B65D 81/34* | (2006.01) | |
| *A23G 3/34* | (2006.01) | |
| *A23L 7/191* | (2016.01) | |

(52) U.S. Cl.
CPC ............ *A23G 3/54* (2013.01); *A23G 3/0063* (2013.01); *A23L 7/191* (2016.08); *A47J 36/027* (2013.01); *B65D 81/3446* (2013.01); *B65D 81/3453* (2013.01)

(58) Field of Classification Search
CPC ...... A23G 3/0063; A23G 3/0002; A23G 3/54; A23G 3/50; A23L 7/10; A23L 7/161; A23L 7/191; B65D 81/3453; B65D 81/3446; A47J 36/027

USPC .......... 426/241; 220/360, 361; 219/735, 757
See application file for complete search history.

(56) References Cited

U.S. PATENT DOCUMENTS

| | | | |
|---|---|---|---|
| 2,183,938 A | 12/1939 | Lewis | |
| 3,744,403 A | 7/1973 | Castronuovo | |
| 4,942,277 A * | 7/1990 | Narberes ............ | B65D 81/3453 |
| | | | 209/235 |
| 6,877,232 B2 | 4/2005 | Harmon et al. | |
| D584,915 S | 1/2009 | Brown | |
| 8,156,859 B2 | 4/2012 | Leason et al. | |
| 2003/0213707 A1 | 11/2003 | Clay | |

(Continued)

OTHER PUBLICATIONS

Jessica, 5 minute chocolate fudge s'more mug cake (http://www.howsweeteats.com/2012/02/5-minute-chocolate-fudge-smores-mug-cake/). 2012.*

(Continued)

*Primary Examiner* — Erik Kashnikow
*Assistant Examiner* — Lela S. Williams

(57) ABSTRACT

A method of coating a wide variety of foodstuffs with tasty marshmallow material simply by enclosing foodstuffs with marshmallows in the same container that permits gaseous venting, but otherwise secures the enclosed foodstuffs. Microwaving the container for one minute or less causes the marshmallow, responding to the microwaves, to radically expand many times its original size. The expanding marshmallow quickly and conveniently coats the secured foodstuffs in the container with a layer of marshmallow material to produce a tasty food treat. The addition of a stick or other handling means is highly desirable, as is a means of easily extracting the food treat from the enclosure and aids in keeping hands clean while eating the food treat.

14 Claims, 11 Drawing Sheets

(56) References Cited

U.S. PATENT DOCUMENTS

2009/0301315 A1* 12/2009 Brown ................... A47J 43/18
99/427
2012/0298676 A1 11/2012 Cooks

OTHER PUBLICATIONS

Thirty Handmade Days, S'more Caramel Popcorn from Your Home Based Mom (http://www.thirtyhandmadedays.com/2011/08/smore_caramel_popcorn_recipe/). 2011.*
Tupperware Vent N Serve Micro Soup Mug Bowl, http://magic-chef-microwave.blogspot.com/2010/04/ tupperware-vent-n-serve-micro-soup-mug.html (Year: 2010).*
Popcorn Balls Recipe (http://www.foodnetwork.com/recipes/paula-deen/popcorn-balls-recipe.html), accessed Aug. 8, 2014 (3 pages).
"S'More to Love STL-600 S'More Maker" (http://www.amazon.com/SMore-To-Love-STL-600-Maker/dp/B003NE4XCG), accessed Aug. 8, 2014 (5 pages).
"Microwave S'mores Machine" (http://www.geekologie.com/2009/12/seen-it-all-now-microwave-smor.php), accessed Aug. 8, 2014 (3 pages).

* cited by examiner

Figure 1A
Figure 1B
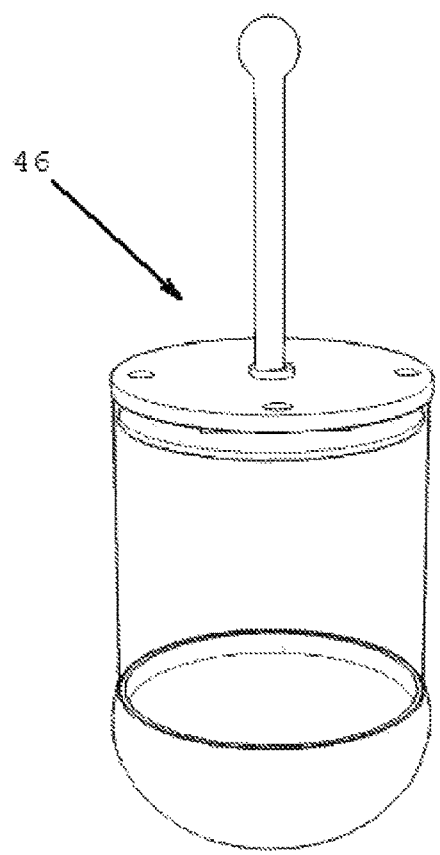
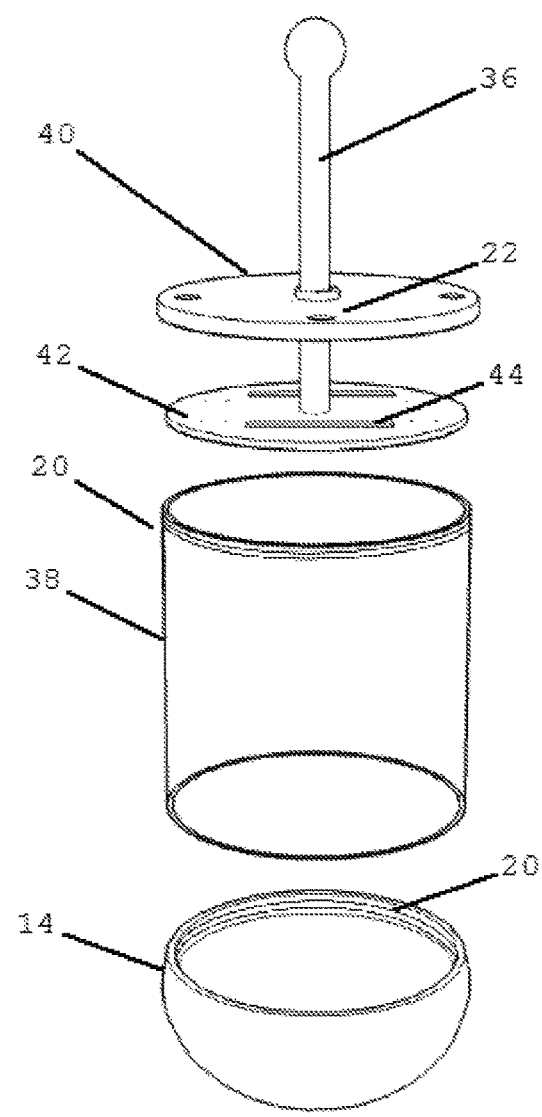

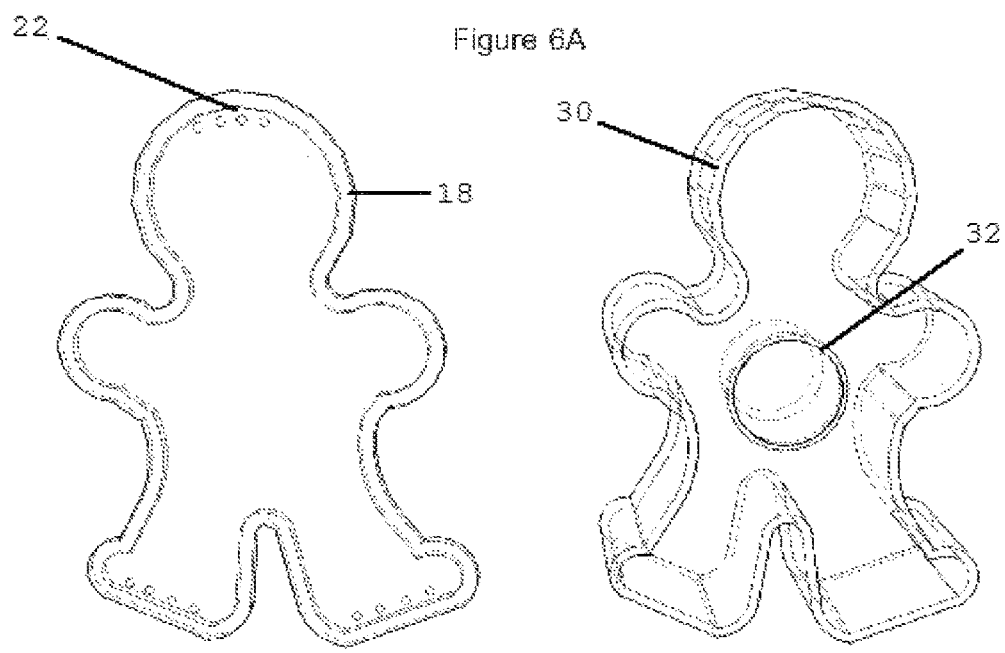
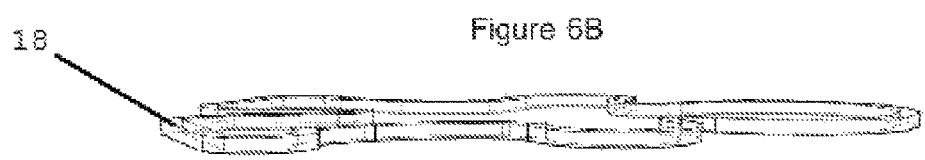
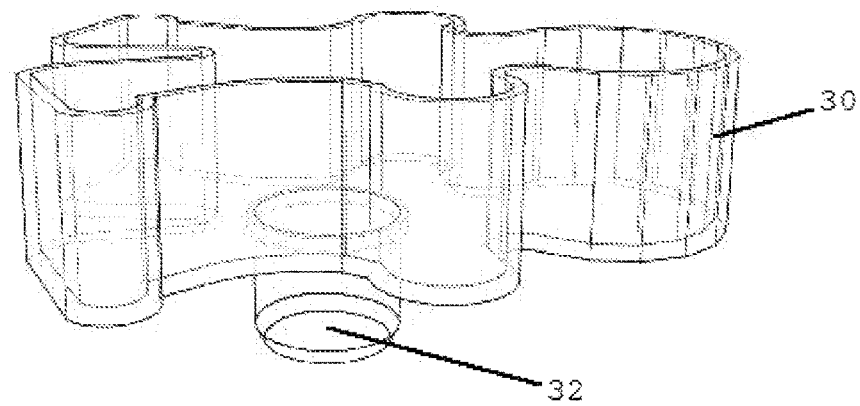

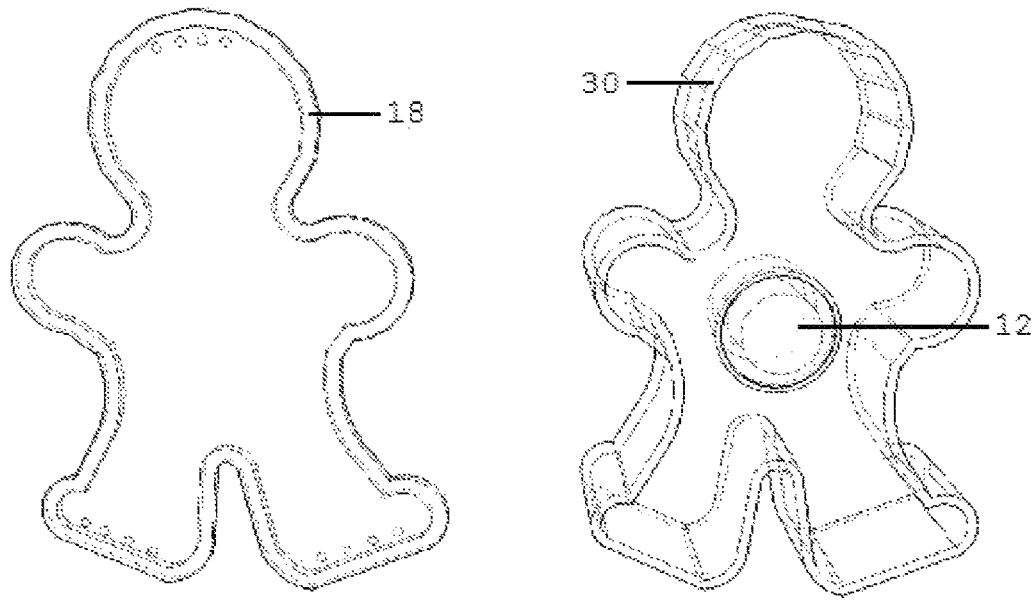
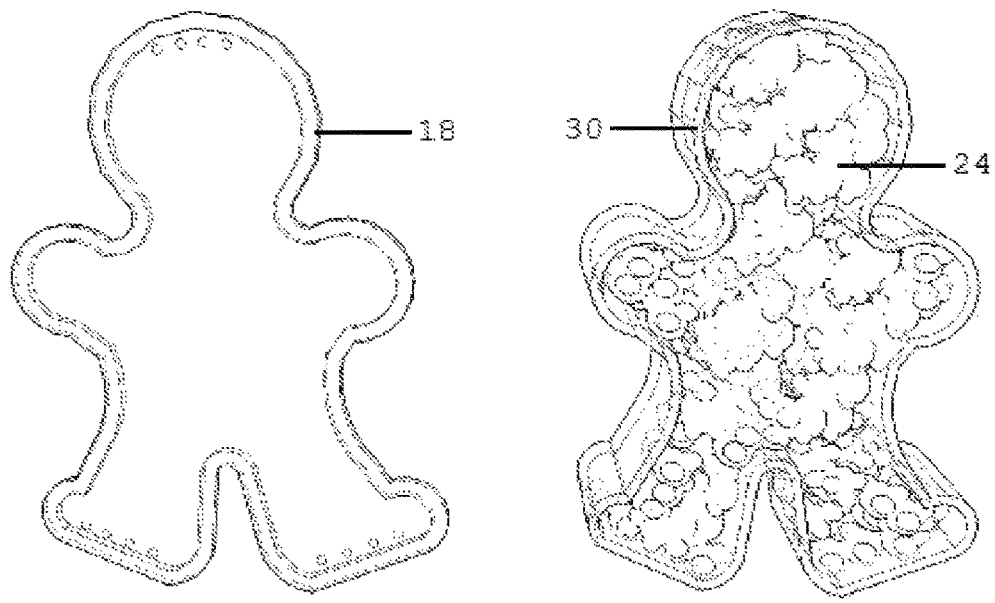

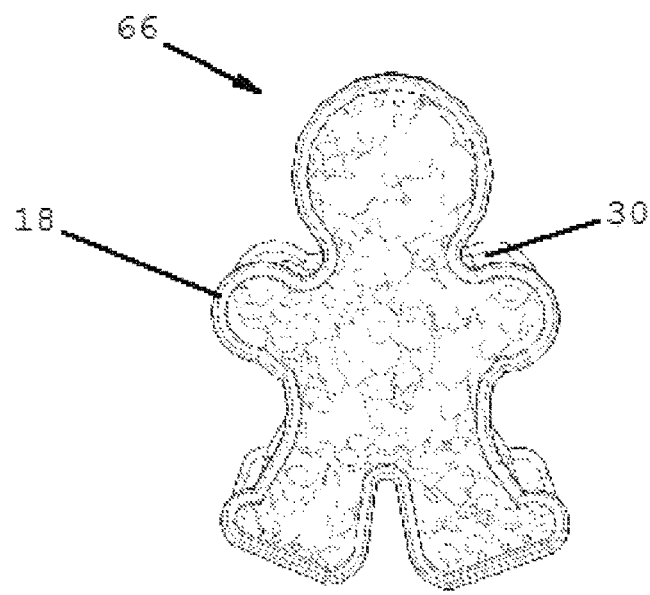
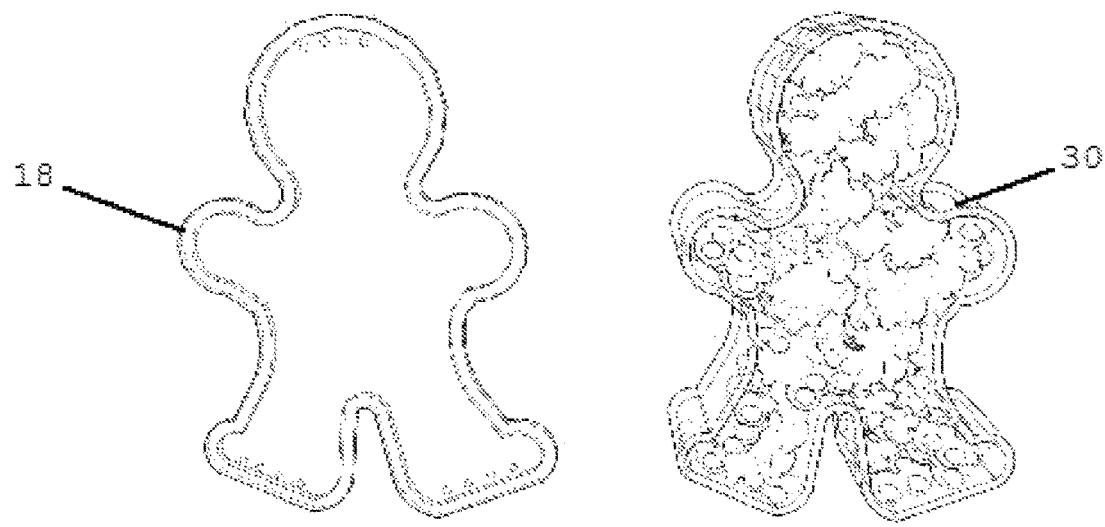

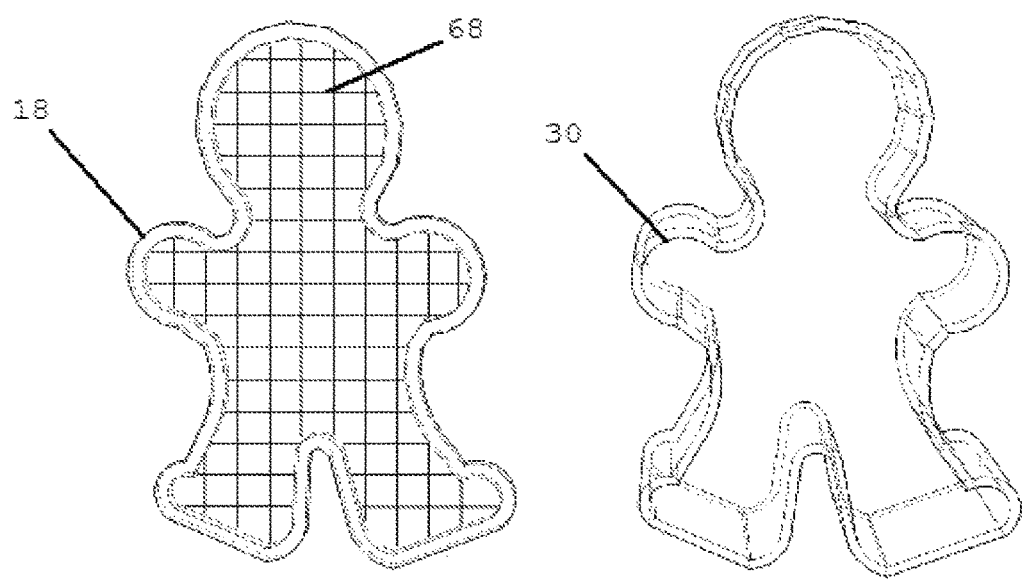
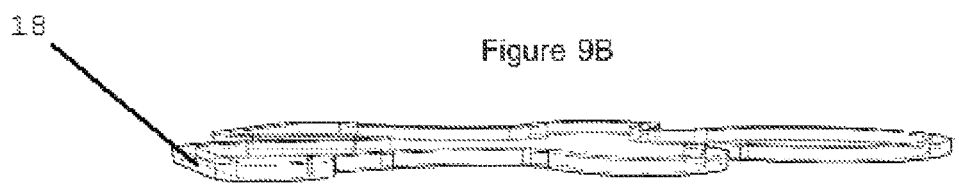
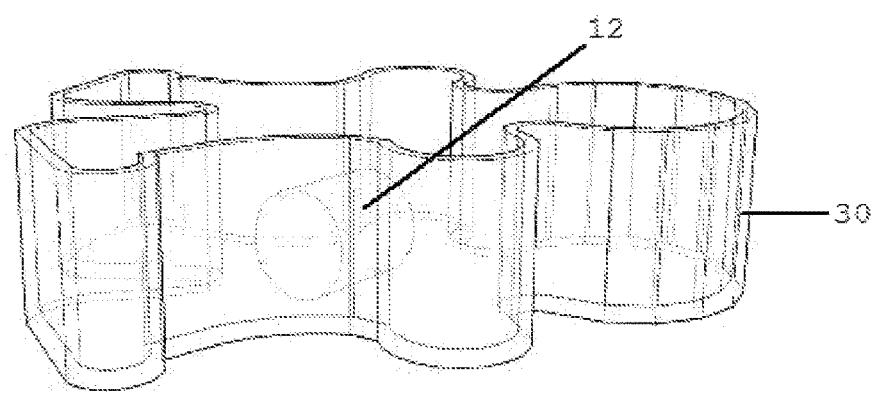

METHOD FOR QUICKLY PREPARING A MARSHMALLOW BASED SNACK

RELATED APPLICATIONS

CROSS-REFERENCE TO RELATED APPLICATIONS

This application claims priority under 35 U.S.C. .sctn. 119 to U.S. Provisional Application No. 61/712,150 entitled "Microwave Cooking Container," which was filed on Oct. 10, 2012, the entire disclosure of which is hereby incorporated by reference.

FEDERALLY SPONSORED RESEARCH

Not Applicable

SEQUENCE LISTING OF PROGRAM

Not Applicable

FIELD OF THE INVENTION

The present invention relates to the method of making food snacks and more particularly to making snacks in a microwave safe cooking container using marshmallows that greatly expand when exposed to microwave radiation coating the contents of the container with marshmallow.

BACKGROUND OF THE INVENTION

In today's busy life, many people don't have time to make snacks from scratch and settle for buying ready to eat snacks. People save time, but the trade off invariably includes extras in the snack that people would prefer not to eat such as artificial colorings and preservatives. People would prefer making snacks themselves and controlling the ingredients, but even making simple snacks like popcorn balls or Rice Krispies® treats typically takes 20 to 30 minutes of prep and cooking time. Plus the chore dirties multiple dishes, uses multiple ingredients and may requires the use of a stove and possibly a candy thermometer. Besides buying ready to eat snacks such as popcorn balls or Rice Krispies® treats one can make snacks the conventional ways using a stove or oven and spend lots of time prepping and cooking. For example, recipes for making popcorn balls requires combining sugar, water, corn syrup, vinegar, salt in a pot on the stove where the ingredients need to be heated to 255 degrees (hard ball stage). Recipes for Rice Krispies® treats require combining butter and marshmallows heated in a pot until everything is melted and then add the Rice Krispies®. Mix and place the mixture in battered pan and serve when cold. There are a number marshmallow related snack making devices in the prior art such as the "Microwave Food Stabilizing Device" (U.S. application Ser. No. 12/134,034) that makes the popular "S'mores" snack. The device works in the microwave and uses the microwaves to heat up the S'more's sandwich consisting of Graham crackers, chocolate bar and marshmallow. A holding device is used to prevent the marshmallow from expanding beyond the S'mores sandwich. Another marshmallow snack making device found in the prior art is the "Marshmallow toasting device", (U.S. Pat. No. 3,744,403). The electric device attempts to toasts the marshmallows like it was cooked outside on an open fire, but without burning and cooking evenly. The listed solutions don't allow snacks to be made in one minute or less, will dirty more than one dish, may require the use of a stove and other specialized equipment such as a candy thermometer. From the prior art listed, the "Microwave Food Stabilizing Device" makes a S'mores snack quickly in the microwave oven, but the design is limited to making only S'mores and the marshmallow restraining arm teaches away from the proposed method and device that wants the marshmallow to expand and fill the cooking container coating the entire contents with marshmallow. Where as the "Marshmallow toasting device" uses heat for toasting, not a microwave oven, so the marshmallow being toasted does not expand nor expected to operate like the proposed method and device.

SUMMARY OF THE INVENTION

A delectable marshmallow based snack may be produced following the method of placing at least one marshmallow into a microwave safe container and placing at least one other foodstuff like popped popcorn, Rice Krispies®, nuts, and other snack-food ingredients in the same container. The container opening is closed with a lid that permits gaseous venting, but otherwise secures the enclosed foodstuffs. The closed container is placed into a microwave oven and cooked for one minute or less. The microwaves cause the marshmallow to radically expand around the secured foodstuffs coating each piece with marshmallow material producing a delectable snack like a Rice Krispies® treat in under a minute.

Thus it is an object of the present invention to provide a method for making a marshmallow based snack in one minute or less.

It is another object of the present invention to provide a method for making a marshmallow based snack with one or more foodstuffs.

It is another object of the present invention to provide a method for making a marshmallow based snack crunchy or chewy by varying the cook time and/or marshmallow count.

It is another object of the present invention to provide a method for making a marshmallow based snack that uses the expanding marshmallow to "carry along" other flavorings such as Caramel to the contained foodstuffs.

It is another object of the present invention to provide a method for making a marshmallow based snack that is entertaining due to the interesting expanding marshmallow behavior that occurs when marshmallow is exposed to microwaves.

It is another object of the present invention to provide a method for making a marshmallow based snack that automatically coats the contained ingredients with a coating of marshmallow without any external mixing of the foodstuffs and marshmallow.

It is another object of the present invention to provide a method for making a marshmallow based snack where the cooking container may also be used as a serving container with or without a handling device.

It is another object of the present invention to provide a method for making other types of snacks such as small cakes in the same cooking container.

It is another object of the present invention that the cooking container permits gaseous venting.

It is another object of the present invention that the cooking container be microwave safe and be strong enough to deal with forces and heat generated by the expanding marshmallow during the cooking process It is another object of the present invention that the cooking container be transparent so users can watch the expanding marshmallow as it coats everything in the container It is another object of the present invention that the cooking container have a reserved place for a marshmallow to maximize the viewing time of the interesting expanding marshmallow behavior that occurs when marshmallow is exposed to microwaves.

BRIEF DESCRIPTION OF THE DRAWINGS

A complete understanding of the present invention may be obtained by reference to the accompanying drawings, when considered in conjunction with the subsequent, detailed description, in which:

FIG. 1A is a perspective view of an assembled push up snack making container;

FIG. 1B is an exploded view of a push up snack making container;

FIG. 6A is a perspective view of a tray snack making container with lid separated;

FIG. 6B is a right perspective view of a tray snack making container with lid separated;

FIG. 7A is a perspective view of a tray snack making container with marshmallow inside;

FIG. 7B is a perspective view of a tray snack making container with popped popcorn inside;

FIG. 8A is a perspective view of an assembled tray snack making container with marshmallow and popped popcorn inside;

FIG. 8B is a perspective view of a tray snack making container with lid removed providing access to the cooked snack;

FIG. 9A is a perspective view of a tray snack making container with no cup and lid separated;

FIG. 9B is a right perspective view of a tray snack making container with no cup with marshmallow inside and lid separated;

For purposes of clarity and brevity, like elements and components will bear the same designations and numbering throughout the Figures.

DESCRIPTION OF THE PREFERRED EMBODIMENT

Figure 2A:
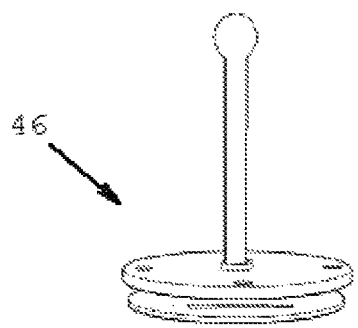
FIG. 2A is a perspective view of a push up snack making container partially assembled showing a marshmallow inside.

In accordance with the present invention, a delectable marshmallow based snack may be produced following the method of placing at least one marshmallow 12 into the base 14 of the container followed by the placement of at least one other foodstuff such as popped popcorn, Rice Krispies®, nuts, and other snack-food ingredients in the same container. The top 40, which permits gaseous venting and includes a plunger 36 assembly as shown in FIG. 1B, is attached to the container so the contained foodstuffs 24 are secured inside the container and cannot leave while cooking. The container is then moved to the microwave oven where it is cooked for a measured period of cooking time such as one minute or less. After cooking is complete, the container is rotated 180 degrees so the top 40 is now on the bottom. The base 14 is removed and the plunger 36 is pushed up to serve the just made snack. Making the container composed of multiple components that connect together using threading 20, friction-fit and other connection methods will allow for the described functionality.

While in the microwave oven, marshmallow, when exposed to microwaves forcefully expands in all directions, releases steam and liquefies at the same time. Placing a marshmallow in a vented container and applying microwaves, the expanding marshmallow coupled with the release of steam quickly moves towards the vents to escape. By placing foodstuffs, secured from leaving the container, in between the marshmallow and the vents forces the expanding marshmallow to fill in the gaps surrounding each foodstuff piece thereby coating each piece. As the expanding marshmallows coats the foodstuffs and given enough foodstuffs, the force and available marshmallow material is greatly reduced so only steam exits the vents. A side benefit of the expanding marshmallow is the process is visually entertaining as the foodstuffs get enveloped by the expanding marshmallow. One can also add an additional flavor to a snack by placing an additional foodstuff such as caramel in the container (not shown) in close proximity of the marshmallows. When the container and its contents are exposed with microwaves, the caramel liquefies becoming a flavoring agent that is carried by the gas and liquid of the expanding marshmallow where it is intermixes and coats the other foodstuffs.

Varying the cooking time can change the texture of the snack, making the snack more chewy or more crunchy. A longer cooking time causes the marshmallow to behave more like melted sugar that hardens when cooled thereby producing a crunchier snack. A short cooking time causes the marshmallow to stay mushy producing a chewier snack. Any sizes of marshmallows can be used in the steps to produce a tasty snack such as jumbo, regular and miniature. The use of miniature marshmallows or relatively small chunks of marshmallow can be directly intermixed with the foodstuffs and using a shorter cooking time can result in less marshmallow expansion and a resulting food snack that contains visible chucks of melted marshmallow intermixed in the foodstuffs.

Referring to FIGS. 1A and 1B shows a Pushup 46 style snack making container composed of multiple components that works for both cooking and serving a cooked snack. All parts are composed of known microwave oven safe materials such as plastics, silicones or glass. FIG. 1A shows the assembled container. FIG. 1B shows the container is made up of components that include a base 14, sleeve 38, plate 42, plunger 36 and top 40. The sleeve 38 is shown to be transparent to show the entertaining cooking process of the contained snack materials being enveloped while cooking. The sleeve 38 is attached to the base 14 by threading 20 it into the base 14 for a secure fit. Other attaching methods are possible besides threading 20 such as a clamp or make the sleeve 38 interlock with the base 14. The top 40 is similarly attached to the sleeve 38. The plunger 36 is attached to a plate 42 that contains one or more vent slots 44 that permits gaseous venting to pass through while cooking a snack. The plunger 36 and plate 42 assembly slides up and down through the top 40 providing a push-up style serving ability that can push up the cooked snack for eating. The top 40 contains one or more vents 22 to also permit gaseous venting to exit the container while cooking a snack.

Figure 2B:
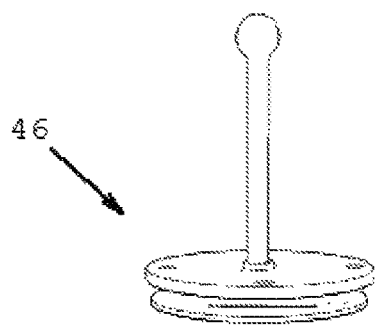
FIG. 2B is a perspective view of a push up snack making container partially assembled showing popped popcorn inside.
Figure 2C:
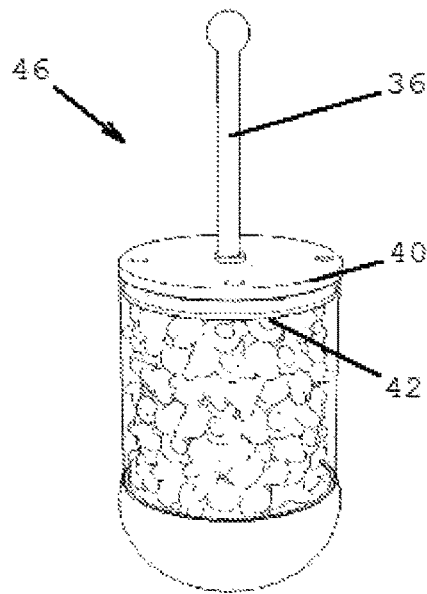
FIG. 2C is a perspective view of an assembled push up snack making container with marshmallow and popped popcorn inside.
Figure 2D:
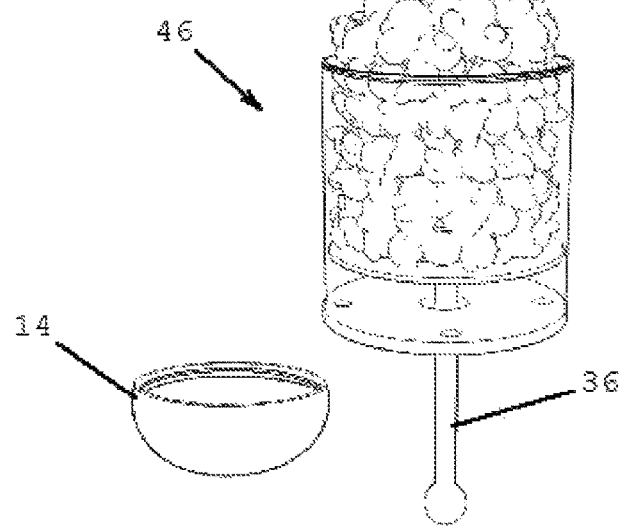
FIG. 2D is a perspective view of a push up snack making container rotated 180 degrees with the base removed providing access to the cooked snack.

Referring to FIGS. 2A, 2B, 2C and 2D shows the snack making process using the Pushup 46 container. FIG. 2A shows the step of a partial assembled Pushup 46 container where a fluffy confectionary such as a marshmallow 12 has been placed into the base 14. A single marshmallow 12 is shown, but multiple or different sized marshmallows could be used. FIG. 2B shows the step of a partial assembled Pushup 46 container where the sleeve 38 has been filled with one or more foodstuffs 24 such as popped popcorn though the foodstuffs 24 could include others such as Rice Krispies®, nuts, and other snack-food ingredients. Additional marshmallow 12 pieces could also be intermixed with the foodstuffs 24 to make a more chewy, marshmallowy snack. FIG. 2C shows the step of the assembled Pushup 46 container containing both the marshmallow 12 and foodstuffs 24. The container takes the next step of being cooked in a microwave oven allowing the marshmallow 12 to expanded coating the contained foodstuffs 24 with liquefied marshmallow 12. The time needed in a typical microwave oven for a four ounce snack is about 30 seconds. FIG. 2D shows the resultant step of rotating the Pushup 46 container with the cooked snack, removing the top 40 of the container and pushing up on the plunger 36 making the snack available for eating. The steps just outlined allows one to make a tasty snack in seconds, but the order of the steps and/or number of steps serve only as guideline to make a snack. For example, you might eliminate the initial marshmallow placement step and just include miniature marshmallows intermixed with the foodstuffs that get placed into the container on the next step.

Given the container is microwave safe and has a venting means it is possible to cook other types of food snacks without marshmallows such as a small cake. Making cakes in the microwave oven are well known in prior art and the proposed step would be to simply replace the marshmallow 12 with cake batter and eliminate the addition other foodstuffs 24. It would be possible to add a few chocolate chips on top 40 of the batter for a tastier snack. The container would be closed and placed in a microwave oven to cook for one minute or less.

Figure 3A:
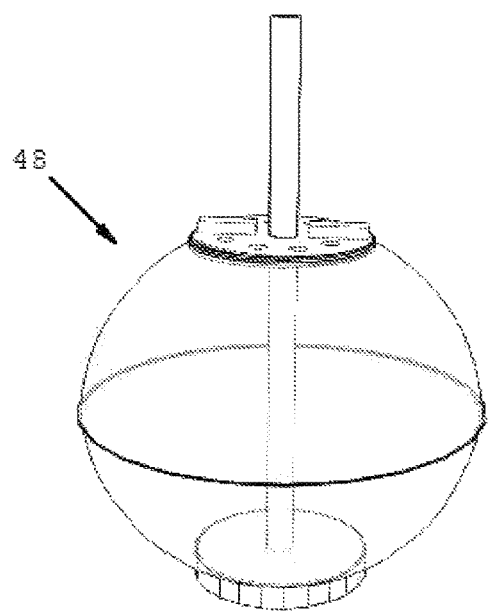
FIG. 3A is a perspective view of an assembled sphere snack making container.
Figure 3B:
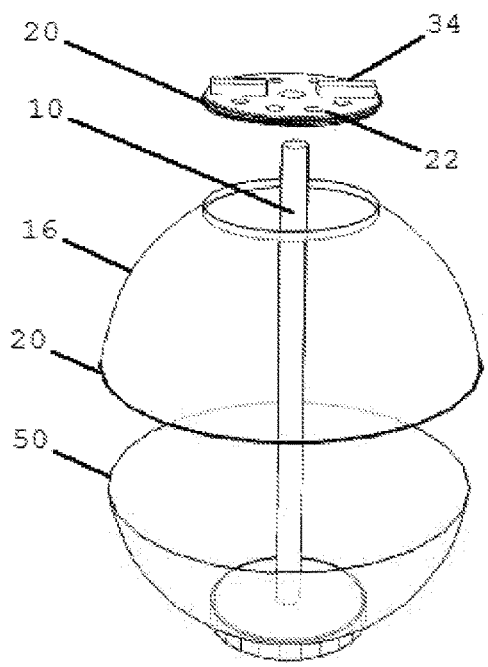
FIG. 3B is an exploded view of a sphere snack making container.
Figure 3C:
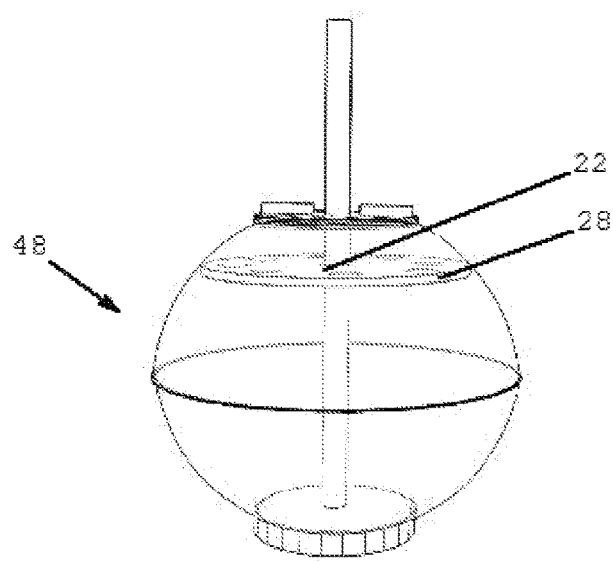
FIG. 3C is a perspective view of an assembled sphere snack making container with snack size reducer installed.

An alternate embodiment makes a delectable marshmallow 12 based snack in a sphere 48 type container that dissembles allowing it to become a serving container. Referring to FIGS. 3A, 3B and 3C shows a Sphere 48 style snack making container that works for both cooking and serving a cooked snack. All parts are composed of known microwave oven safe materials such as plastics, silicones or glass. FIG. 3A shows the assembled container. FIG. 3B shows the container is made of components that include a bottom 50, cover 16, cap 34 and stick 10. The cover 16 and bottom 50 are shown to be transparent to show the entertaining cooking process of the contained snack materials being enveloped while cooking. The bottom 50 is attached to the cover 16 by threading 20 them together for a secure fit. Other attaching methods are possible besides threading 20 such as a clamp or make the cover 16 interlock with the bottom 50. The cap 34 is similarly attached to the cover 16. The cap 34 contains one or more vents 22 to permit gaseous venting to exit the container while cooking a snack. A hole in the cap 34 is also provided for a stick 10 to pass though. The stick 10 holds the marshmallow 12 in place in the sphere 48 bottom 50 and serves as a handle for greater convenience in holding and eating the snack. FIG. 3C shows the container assembled with a reducer 28 disk that has been added on to the stick 10 and placed in the Sphere 48 cover 16. The reducer 28 disk prevents foodstuffs 24 from filling up the cover 16 resulting in a smaller size snack. The reducer 28 disk has one or more vent slots 44 that permits gaseous venting.

Figure 4A:
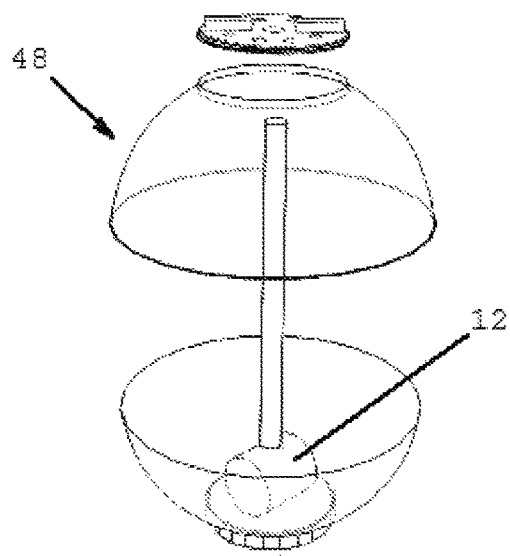
FIG. 4A is a perspective view of a sphere snack maker container partially assembled showing a marshmallow inside.
Figure 4B:
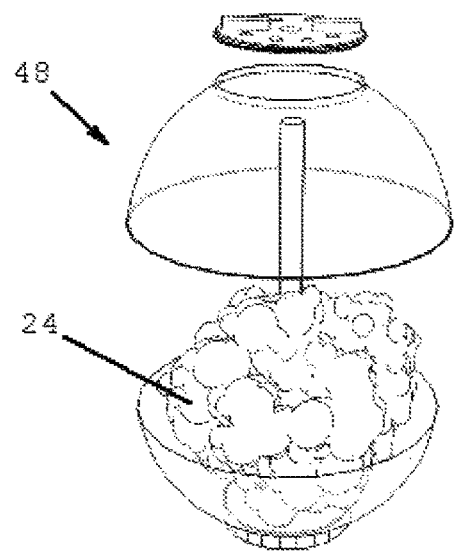
FIG. 4B is a perspective view of a sphere snack maker container partially assembled showing popped popcorn inside.
Figure 4C:
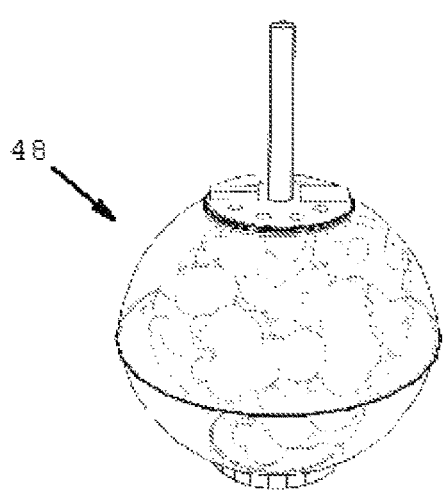
FIG. 4C is a perspective view of an assembled sphere snack maker container with marshmallow and popped popcorn inside.
Figure 4D:
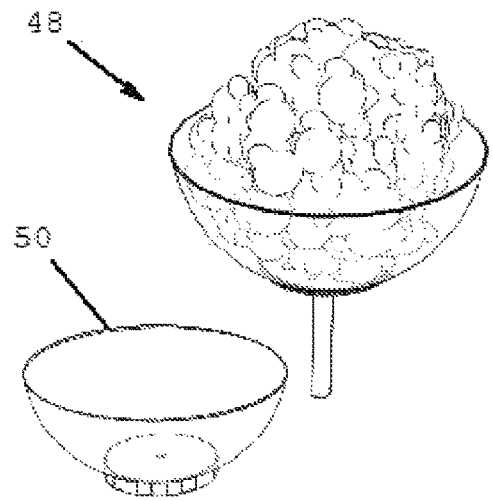
FIG. 4D is a perspective view of a sphere snack making container rotated 180 degrees with the bottom removed providing access to the cooked snack.

Referring to FIGS. 4A, 4B, 4C and 4D shows the snack making process using the Sphere 48 container. FIG. 4A shows the step of a partial assembled Sphere 48 container where a fluffy confectionary such as a marshmallow 12 has been placed into the bottom 50. A single marshmallow 12 is shown, but multiple or different sized marshmallows could be used. A stick 10 is shown piercing the marshmallow 12 and standing up. FIG. 4B shows the step of a partial assembled Sphere 48 container where the bottom 50 has been filled with one or more foodstuffs 24 such as popped popcorn though the foodstuffs 24 could include others such as Rice Krispies®, nuts, and other snack-food ingredients. Additional marshmallow 12 pieces could also be intermixed with the foodstuffs 24 to make a more chewy, marshmallowy snack. FIG. 4C shows the step of the assembled Sphere 48 container containing both the marshmallow 12 and foodstuffs 24. The container takes the next step of being cooked in a microwave oven allowing the marshmallow 12 to expanded coating the contained foodstuffs 24 with liquefied marshmallow 12. The time needed in a typical microwave oven for a four ounce snack is about 30 seconds. FIG. 4D shows the resultant step of rotating the Sphere 48 container with the cooked snack downward and removing the bottom 50 of the container. Once the bottom 50 has been removed the snack is available for eating while holding on to the stick 10 to keep your hands clean. The steps just outlined allows one to make a tasty snack in seconds, but the order of the steps and/or number of steps serve only as guideline to make a snack. For example, you might first add the foodstuffs 24 into the container and then add the marshmallow 12 before cooking.

Figure 5A:
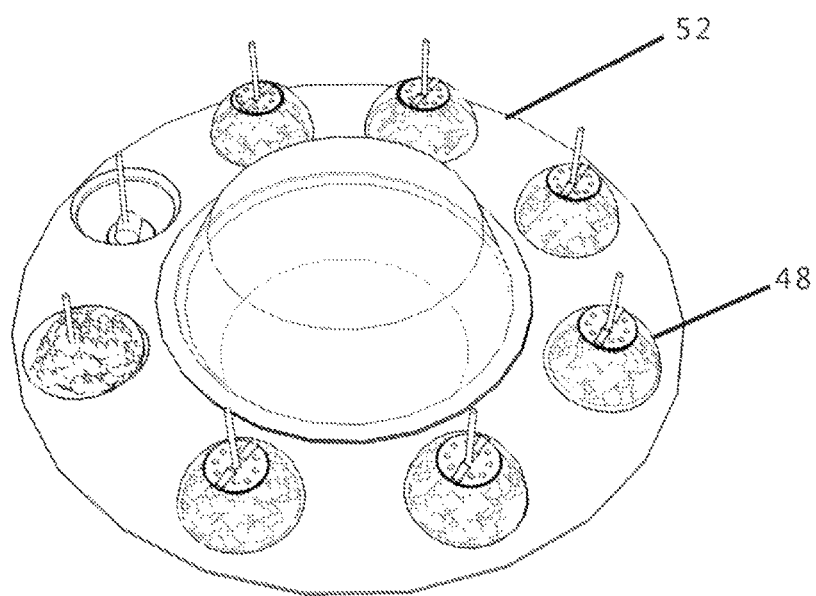
FIG. 5A is a perspective view of a multiple spheres holder with assembled microwave popcorn cooking enclosure.
Figure 5B:
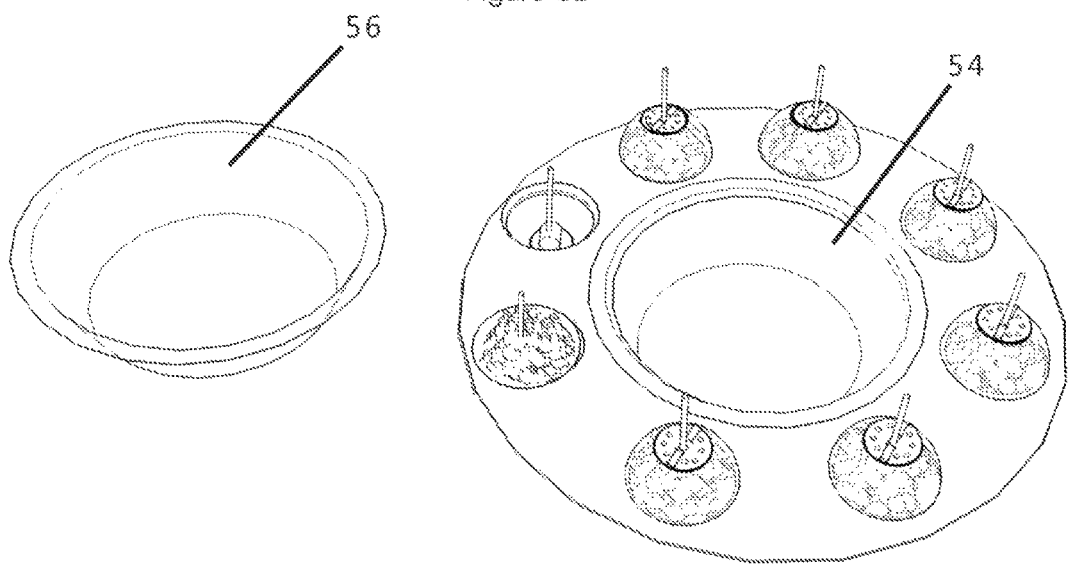
FIG. 5B is a perspective view of a multiple spheres holder with microwave popcorn cooking bowl removed.

Referring to FIGS. 5A and 5B shows a holder 52 that is able to hold multiple Sphere 48 shaped snack containers. The holder 52 is composed of known microwave oven safe materials such as plastics, silicones or glass. Besides holding multiple Sphere 48 shaped snack containers the holder 52 contains a microwave popcorn 24 cooker consisting of a pan 54 and removable bowl 56.

An alternate embodiment makes a delectable marshmallow 12 based snack in a simple tray 66 type container. The container includes a reserved spot just for the marshmallow 12 allowing the snack shape not be affected by the actions of the marshmallow 12.

Referring to FIGS. 6A and 6B shows a Tray 66 style snack making container that works for both cooking and serving a cooked snack. All parts are composed of known microwave oven safe materials such as plastics, silicones or glass. The container is composed of a form 30, cup 32 and lid 18. The form 30, cup 32 and lid 18 are shown to be transparent to show the entertaining cooking process of the contained snack materials being enveloped while cooking. The lid 18 is attached to the form 30 with a simple stretch fit where the lid 18 is a flexible material like silicone that is stretched over the form 30 for a secure fit. Other attaching methods are possible besides stretch such as a clamp or make the lid 18 interlock with the form 30. The lid 18 contains one or more vents 22 to permit gaseous venting to exit the container while cooking a snack.

Referring to FIGS. 7A, 7B, 8A, 8B, 9A and 9B shows the basic snack making process using the Tray 66 container. FIG. 7A shows the step of a partial assembled Tray 66 container where a fluffy confectionary such as a marshmallow 12 has been placed into the cup 32 below the form 30 bottom. A single marshmallow 12 is shown, but multiple or different sized marshmallows could be used. FIG. 7B shows the step of a partial assembled Tray 66 container where the form 30 has been filled with one or more foodstuffs 24 such as popped popcorn though the foodstuffs 24 could include others such as Rice Krispies®, nuts, and other snack-food ingredients. Additional marshmallow 12 pieces could also be intermixed with the foodstuffs 24 to make a more chewy, marshmallowy snack. FIG. 8A shows the step of the assembled Tray 66 container containing both the marshmallow 12 and foodstuffs 24. The container takes the next step of being cooked in a microwave oven allowing the marshmallow 12 to expanded coating the contained foodstuffs 24 with liquefied marshmallow 12. The time needed in a typical microwave oven for a four ounce snack is about 30 seconds. FIG. 8B shows the resultant step of removing the lid 18 from the form 30. Once the lid 18 has been removed the snack is available for eating. The steps just outlined allows one to make a tasty snack in seconds, but the order of the steps and/or number of steps serve only as guideline to make a snack. FIG. 9A shows a Form 30 container and an open screen 68 in place of a solid lid 18 with vent 58 holes. The use of an open screen 68 will secure the foodstuff in the form 30 and allow more venting if additional marshmallows are used. FIG. 9B shows the form without the cup 32 to hold the marshmallow 12 as shown in FIGS. 6A and 6B is not used in this embodiment. Instead, the marshmallow 12 is placed on the form 30 back as shown and the remaining steps followed.

An alternate embodiment makes a delectable marshmallow 12 based snack using an marshmallow 12 cooking container that sprays liquefied marshmallow 12 toward or into a vessel 62 containing other foodstuffs 24. Referring to FIGS. 10A, 10B, 11A and 11B shows a snack making setup consisting of a Pod 60 shaped container with a movable vent 58 in the shape of a hose that can be directed into a vessel 62. All parts are composed of known microwave oven safe materials such as plastics, silicones, ceramics or glass. The container and vessel 62 are transparent to show the entertaining cooking process of the expanding marshmallow 12 and spraying of the expanded marshmallow 12.

Figure 10A:
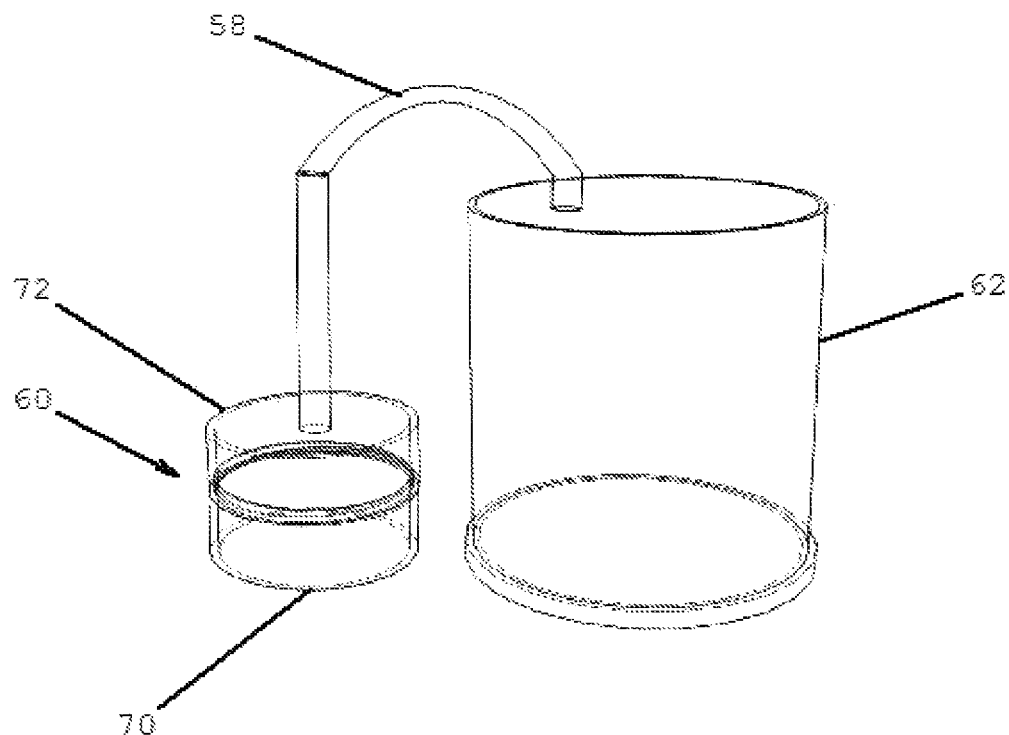
FIG. 10A is a perspective view of an assembled pod cooking chamber with a glass vessel.
Figure 10B:
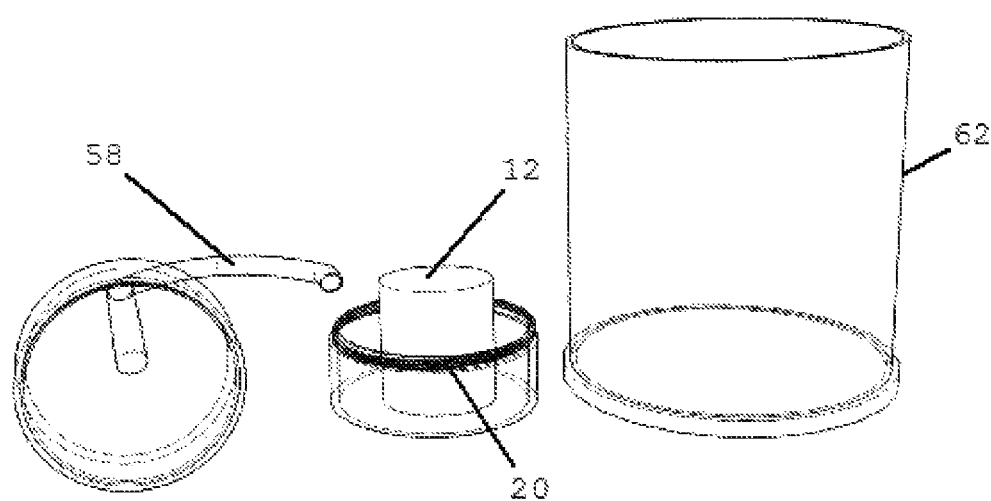
FIG. 10B is a perspective view of a pod cooking chamber disassembled with marshmallow inside.
Figure 11A:
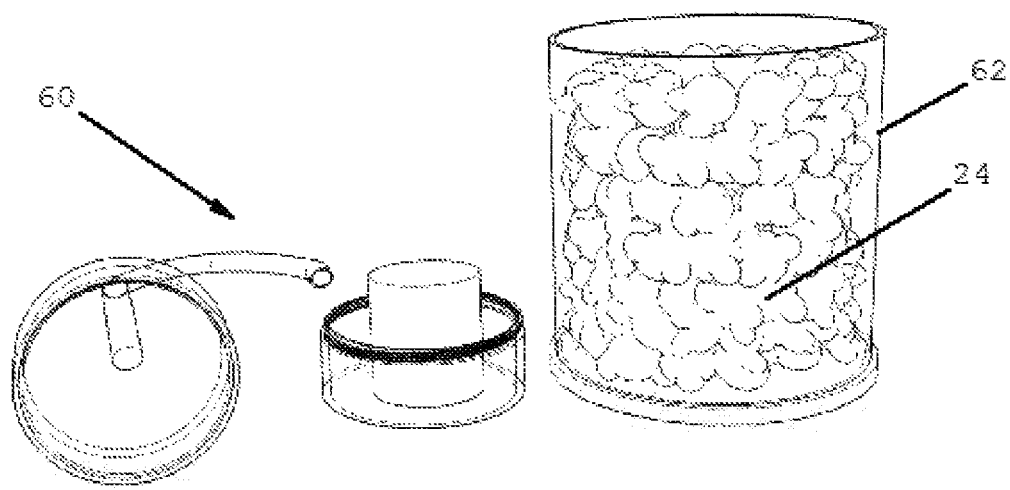
FIG. 11A is a perspective view of a pod cooking chamber disassembled with marshmallow inside and popped popcorn inside the glass vessel.
Figure 11B:
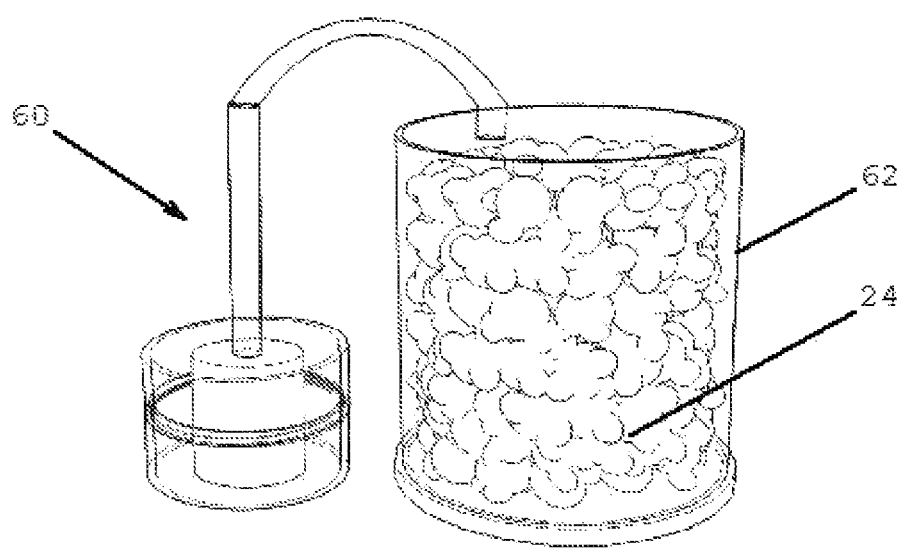
FIG. 11B is a perspective view of an assembled pod cooking chamber with marshmallow inside and popped popcorn inside the glass vessel.

FIG. 10A shows the snack making setup consisting of a pod 60 shaped container made up of two pieces, the pod top 72 and the pod base 70 with appropriate threading 20 so the two pieces can be closed together for an air tight fit. The movable vent 58 exits the pod top 72 and permits venting from inside the container which can be directed. FIG. 10B shows the step of the partial assembled pod 60 container split into two pieces where a fluffy confectionary such as a marshmallow 12 has been placed into the pod base 70. A single marshmallow 12 is shown, but multiple marshmallows or different sized marshmallows could be used. One can add additional flavors to the snack by using a flavoring agent such as a caramel that liquefies when heated by microwaves. Placing the caramel in the container (not shown) in close proximity of the marshmallows where the caramel becomes a flavoring agent that is carried by the gas and liquid of the expanding marshmallow 12 as it sprays onto the foodstuffs 24 contained in the vessel 62 when the contents of container are exposed to microwaves. FIG. 11A shows the step of a partial assembled pod 60 and the vessel 62 that has been filled with one or more foodstuffs 24 such as popped popcorn though the foodstuffs 24 could include others such as Rice Krispies®, nuts, and other snack-food ingredients. Additional marshmallow 12 pieces could also be intermixed with the foodstuffs 24 to make a more chewy, marshmallowy snack. FIG. 11B shows the step of the assembled Pod 60 container containing the marshmallow 12 and foodstuffs 24 placed into the vessel 62. The container takes the next step of being cooked in a microwave oven causing the marshmallow 12 to expanded in the pod 60 spraying liquefied marshmallow 12 through the movable vent 58 onto the foodstuffs 24 contained in the vessel 62. The time needed in a typical microwave oven for a four ounce snack is about 30 seconds. After the microwave use, the vessel 62 can be removed from the microwave and the newly created snack eaten. The steps just outlined allows one to make a tasty snack in seconds, but the order of the steps and/or number of steps serve only as guideline to make a snack. For example, you might first add the foodstuffs 24 into the vessel 62 and then add the marshmallow 12 into the pod 60 before cooking.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method for preparing a microwave marshmallow coated snack using a marshmallow coating snack maker kit wherein the method comprises:
    placing at least one marshmallow and at least one other foodstuff in a microwave safe container, wherein said microwave safe container comprises:
        a microwave safe container wherein the container comprises a base, a separable sleeve, a plunger assembly, and a top;

wherein the plunger assembly comprise a plunger attached to a plate, said plate having one or more vents slots, and wherein said plunger assembly slides up and down through a hole in the top, the top further comprises at least one vent; and sealing the base to one end of the separable sleeve by at least one of threading, clamping, or interlocking fit; and sealing the top to the other end of the separable sleeve by at least one of threading, clamping, or interlocking fit; and microwave heating said container, at least one marshmallow and at least one other foodstuff for a time sufficient to allow said marshmallow to liquefy and expand around the at least one foodstuff within the sealed container without any external mixing.

2. The method of claim 1, wherein said foodstuff includes popped popcorn, nuts, chocolate, caramel, breakfast cereals and other snack-food ingredients.

3. The method of claim 1, wherein the cooking time is varied to affect how chewy or crunchy the resultant snack will be.

4. The method of claim 1, further comprising an additional flavoring agent in close proximity of said marshmallow, said agent includes at least one other foodstuff, whereby said agent is carried by the gas and marshmallow expansion and intermixes with and coats the said at least one foodstuff when the contents of said container are exposed to microwave heating.

5. The method of claim 1, wherein a plurality of marshmallows are intermixed with said foodstuff prior to applying microwave energy to said sealed container.

6. A marshmallow coating snack maker kit comprising:
at least one foodstuff; and
at least one marshmallow; and
a microwave safe container wherein the container comprises a base, a separable sleeve, a plunger assembly, and a top;
wherein the plunger assembly comprise a plunger attached to a plate, said plate having one or more vents slots, and wherein said plunger assembly slides up and down through a hole in the top providing a push-up style serving ability that can push up a cooked marshmallow coated snack; and
wherein said base is removably attached to one end of the separable sleeve by at least one of threading, clamping, or interlocking fit; and
wherein said top also comprises at least one vent and wherein the top is removeably attached to the other end of the separable sleeve by at least one of threading, clamping, or interlocking fit; and
wherein said at least one foodstuff and at least one marshmallow are sealed inside the microwave safe container; and wherein the microwave safe container allows for the marshmallow to liquefy and expand without any external mixing around the at least one foodstuff to provide a marshmallow coated snack.

7. The snack maker kit of claim 6, wherein said foodstuffs includes popped popcorn, nuts, chocolate, caramel, breakfast cereals and other snack-food ingredients.

8. The snack maker kit of claim 6 wherein said container is transparent.

9. A marshmallow coating snack maker kit comprising:
at least one foodstuff; and
at least one marshmallow; and
a microwave safe container wherein the container comprises a bottom, a cover, a cap comprising one or more vents, and a removable positionable stick;
wherein said bottom is removably attached to the cover by at least one of threading, clamping, or interlocking fit; and
wherein said cap is removably attached to the cover by at least one of threading, clamping, or interlocking fit; and
wherein said at least one foodstuff and at least one marshmallow are sealed inside the microwave safe container; and wherein the microwave safe container allows for the marshmallow to liquefy and expand without any external mixing around the at least one foodstuff to provide a marshmallow coated snack.

10. The snack maker kit of claim 9 wherein said container further comprises a removable positionable reducer, said reducer comprising a thickness of microwave safe material and having at least one vent, said reducer when in place inside said container serves to wall off a portion of open space therein allowing for a smaller size snack to be made in the remaining space.

11. The snack maker kit of claim 9 wherein said cap further comprises a center hole and said removable positionable stick passes through said hole and extends into the sealed container to hold the marshmallow in place or passes through said hole to serve as a handle in holding said container while eating the coated snack.

12. The snack maker kit of claim 9, wherein said foodstuffs includes popped popcorn, nuts, chocolate, caramel, breakfast cereals and other snack-food ingredients.

13. The snack maker kit of claim 9, further comprises a holder for holding a plurality of snack maker kits in order to produce multiple coated snacks in a single microwave heat cycle, said holder is formed of a microwave safe material.

14. The snack maker kit of claim 13, wherein said holder includes a microwave popcorn cooker consisting a pan and a removable bowl formed of a microwave safe material, said cooker allows raw popcorn to be popped with microwave heating and then used as a foodstuff ingredient in the snack maker.

* * * * *